United States Patent [19]
Song

[11] Patent Number: 5,564,331
[45] Date of Patent: Oct. 15, 1996

[54] APPARATUS FOR ROASTING COFFEE BEANS

[75] Inventor: Eugene Song, Seoul, Rep. of Korea

[73] Assignee: Imex Corporation Ltd., Seoul, Rep. of Korea

[21] Appl. No.: 506,708

[22] Filed: Jul. 25, 1995

Related U.S. Application Data

[63] Continuation-in-part of Ser. No. 333,762, Nov. 3, 1994, abandoned.

[30] Foreign Application Priority Data

May 9, 1995 [KR] Rep. of Korea ............... 95-11209

[51] Int. Cl.$^6$ .................... A23N 12/00; A47J 31/42; A47J 42/52
[52] U.S. Cl. .................... 99/469; 34/225; 34/233; 34/594; 99/286; 99/476; 99/483; 99/525
[58] Field of Search ............... 99/286, 357, 469, 99/476, 483, 518, 525, 600, 601, 609–611; 34/233, 533, 594, 225, 68, 267, 609, 136, 560, 181, 589; 366/101, 107, 165; 219/385, 386, 389, 400; 241/65, 100; 426/466, 467

[56] References Cited

U.S. PATENT DOCUMENTS

| | | | |
|---|---|---|---|
| 4,271,603 | 6/1981 | Moore, III | 34/233 |
| 4,325,191 | 4/1982 | Kumagai et al. | 99/286 |
| 4,841,849 | 6/1989 | Shimomura et al. | 99/286 |
| 4,860,461 | 8/1989 | Tamaki et al. | 34/609 |
| 4,895,308 | 1/1990 | Tanaka | 99/286 |
| 5,269,072 | 12/1993 | Waligorski | 34/225 |

*Primary Examiner*—Timothy F. Simone
*Attorney, Agent, or Firm*—Nixon & Vanderhye

[57] ABSTRACT

The present invention relates to an apparatus for roasting raw coffee beans which apparatus can instantly roast a small quantity of raw coffee beans according to personal taste and provide a unique taste and fragrance of coffee, and in particular to an apparatus suitable for home use. The apparatus has a roasting vessel for containing raw coffee beans to be roasted. A plurality of air openings are provided for creating a whirling vertical motion to a heated airstream ascending therethrough, whereby the raw beans are roasted and also caused to have their hulls separated and caused to ascend upwardly with the airstream to a hull-receiving vessel.

21 Claims, 11 Drawing Sheets

APPARATUS FOR ROASTING COFFEE BEANS

CROSS-REFERENCE TO RELATED APPLICATION

This application is a continuation-in-part of my application, Ser. No. 08/333,762 filed on Nov. 3, 1994 which is now abandoned.

BACKGROUND OF THE INVENTION

The present invention relates to an apparatus for roasting raw coffee beans, which apparatus is capable of instantly roasting a small quantity of raw coffee beans according to personal taste, and provides a unique taste and fragrance of coffee, and in particular to an apparatus suitable for home use.

Coffee is a popular drink. Drinking coffee has been prepared by boiling raw beans with a percolator or by mixing coffee powders in boiling water. In the present days, however, people have a tendency to prefer raw bean coffee which is superior in taste and fragrance.

In spite of its quality, the taste and fragrance of raw bean coffee can be changed not only by the ways of processing raw beans, but also in the manner it is stored. Thus, in order to enjoy the particular taste and fragrance of raw bean coffee, after purchasing raw beans in a small quantity, people have to instantly process raw beans properly whenever required.

SUMMARY OF THE INVENTION

The present invention was made with a view to satisfying the aforementioned requirements, and its object is to provide an apparatus for roasting raw coffee beans at home according to personal taste.

To accomplish the object of the present invention there is provided an apparatus for roasting raw coffee beans comprising a main housing having an air inlet; a blower fan assembly mounted on the main housing for blowing air; a heater assembly mounted on the housing and above the blower fan assembly for generating heat, the blower fan assembly directing the heat upwardly; a roasting vessel above the heater assembly for containing raw coffee beans to be roasted; a hull-receiving vessel for receiving and storing the hulls of the raw coffee beans blown along the air stream directed thereto from the roasting vessel, the hull-receiving vessel having an air outlet; a cover for covering the roasting vessel, the cover guiding hulls from the raw coffee beans along the path of the air stream; and a power means for providing power to the blower fan assembly and the heater assembly.

The apparatus of the invention is adapted to roast raw coffee beans by means of a heated airstream for a predetermined period of time, to simultaneously remove raw-bean hulls, and then to apply a cooling airstream at the end of the roasting process.

BRIEF DESCRIPTION OF THE DRAWINGS

The above object and other advantages of the present invention will become more apparent by describing in detail preferred embodiments thereof with reference to the attached drawings in which.

DESCRIPTION OF THE PREFERRED EMBODIMENT

The preferred embodiments of the present invention will be described hereinafter in more detail by reference to the accompanying drawings.

Referring to FIGS. 1–8, the apparatus for roasting raw coffee beans according to one embodiment of the present invention comprises a main housing having an air inlet; a blower fan assembly mounted on the main housing for blowing air; a heater assembly mounted in the housing and above the blower fan assembly for generating heat, the blower fan assembly directing the heat upwardly; a roasting vessel above the heater assembly for containing raw coffee beans to be roasted; a hull-receiving vessel for receiving and storing the hulls of the raw coffee beans blown along the air stream directed thereto from the roasting vessel, the hull-receiving vessel having an air outlet; a cover for covering the roasting vessel, the cover guiding hulls from the raw coffee beans along the path of the air stream; and a power means for providing power to the blower fan assembly and the heater assembly, wherein the roasting vessel includes a plurality of holes for allowing the heated air stream from the heater assembly to enter into the interior of the roasting vessel, and the cover has a hull-guide means for directing the hulls from the roasted coffee beans along a specific downstream path.

Figure 1:
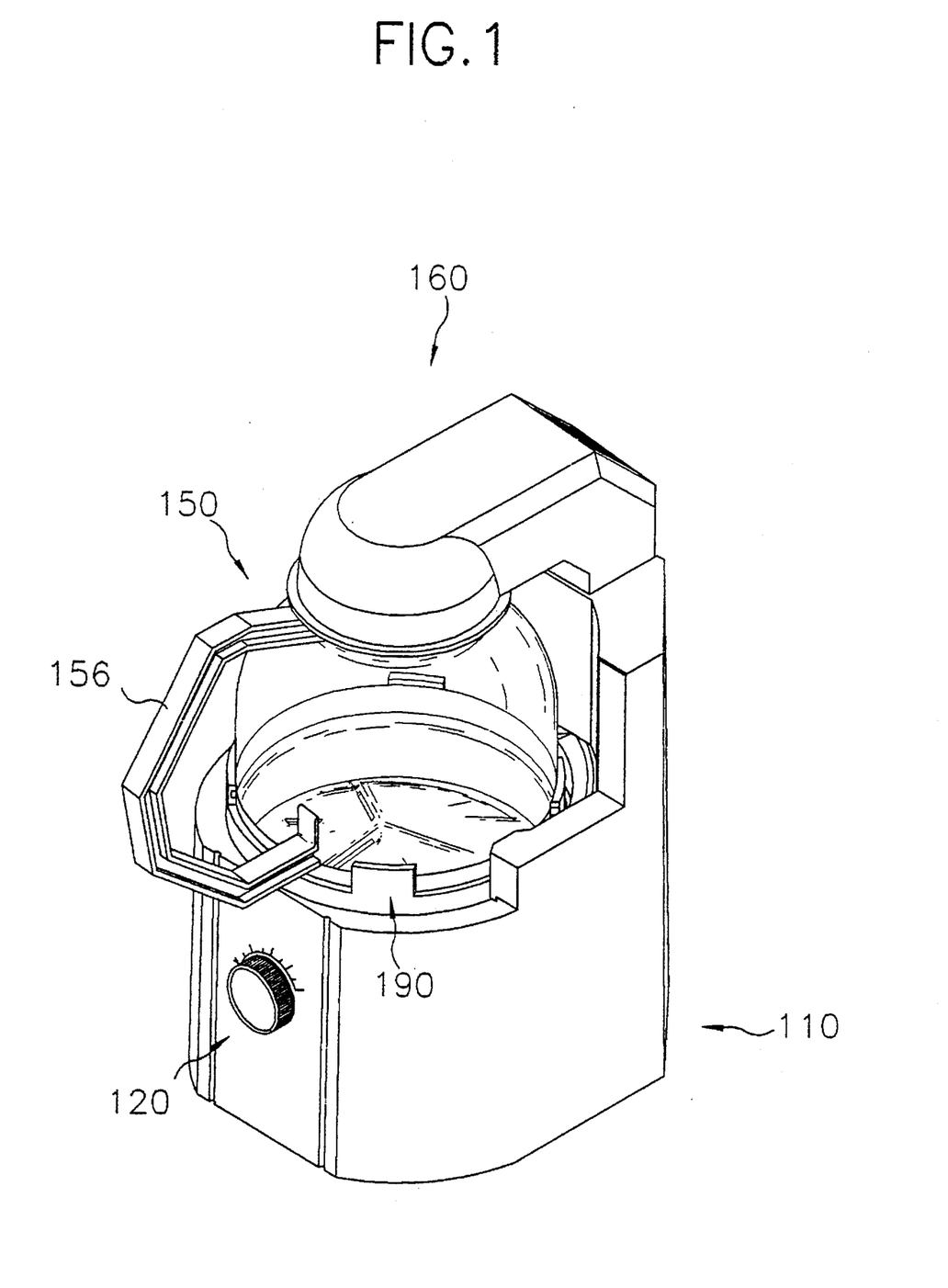
FIG. 1 is a perspective view of an apparatus according to one embodiment of the present invention in its assembled state.
Figure 2:
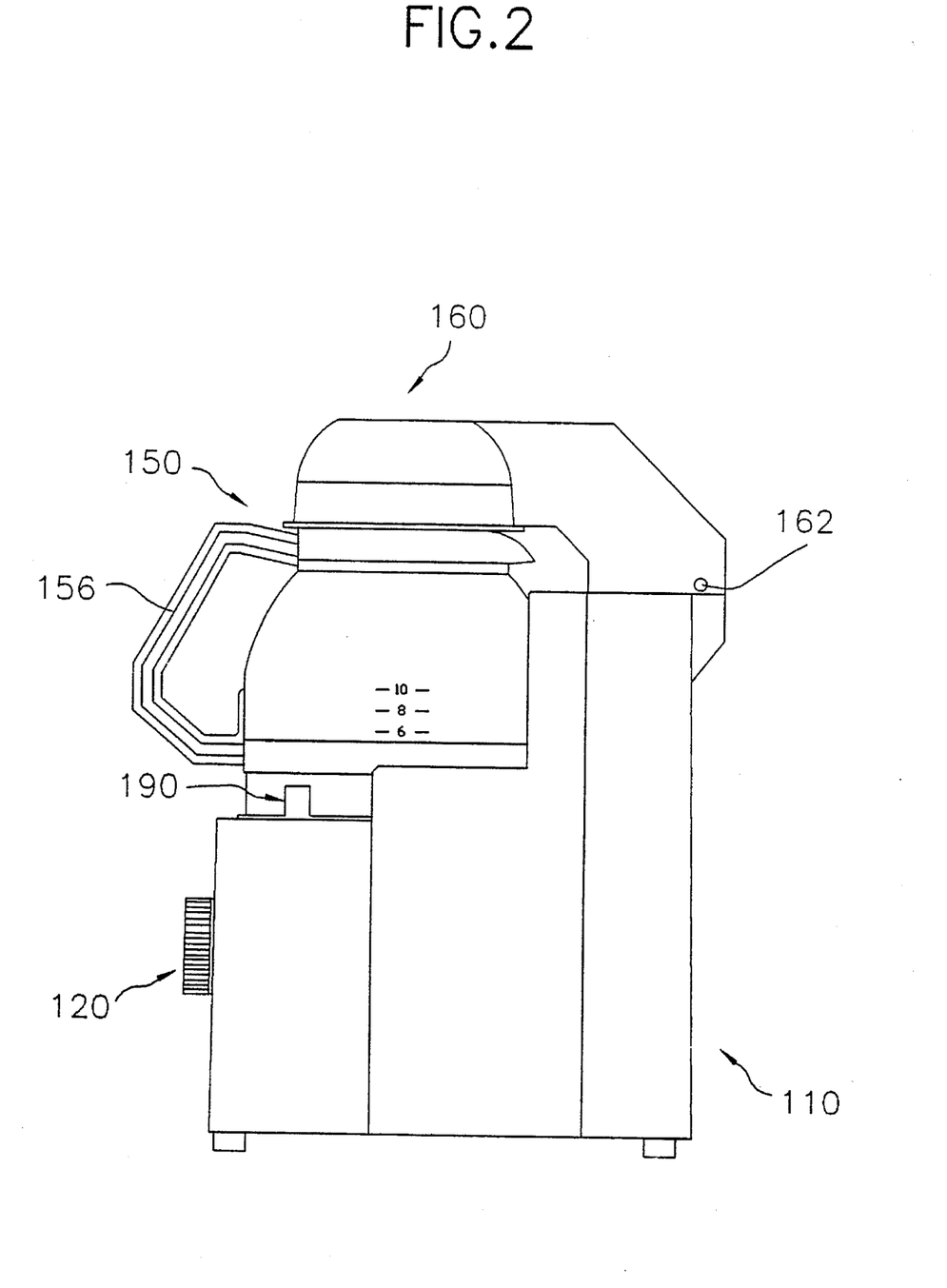
FIG. 2 is a side view of the apparatus illustrated in FIG. 1.
Figure 3:
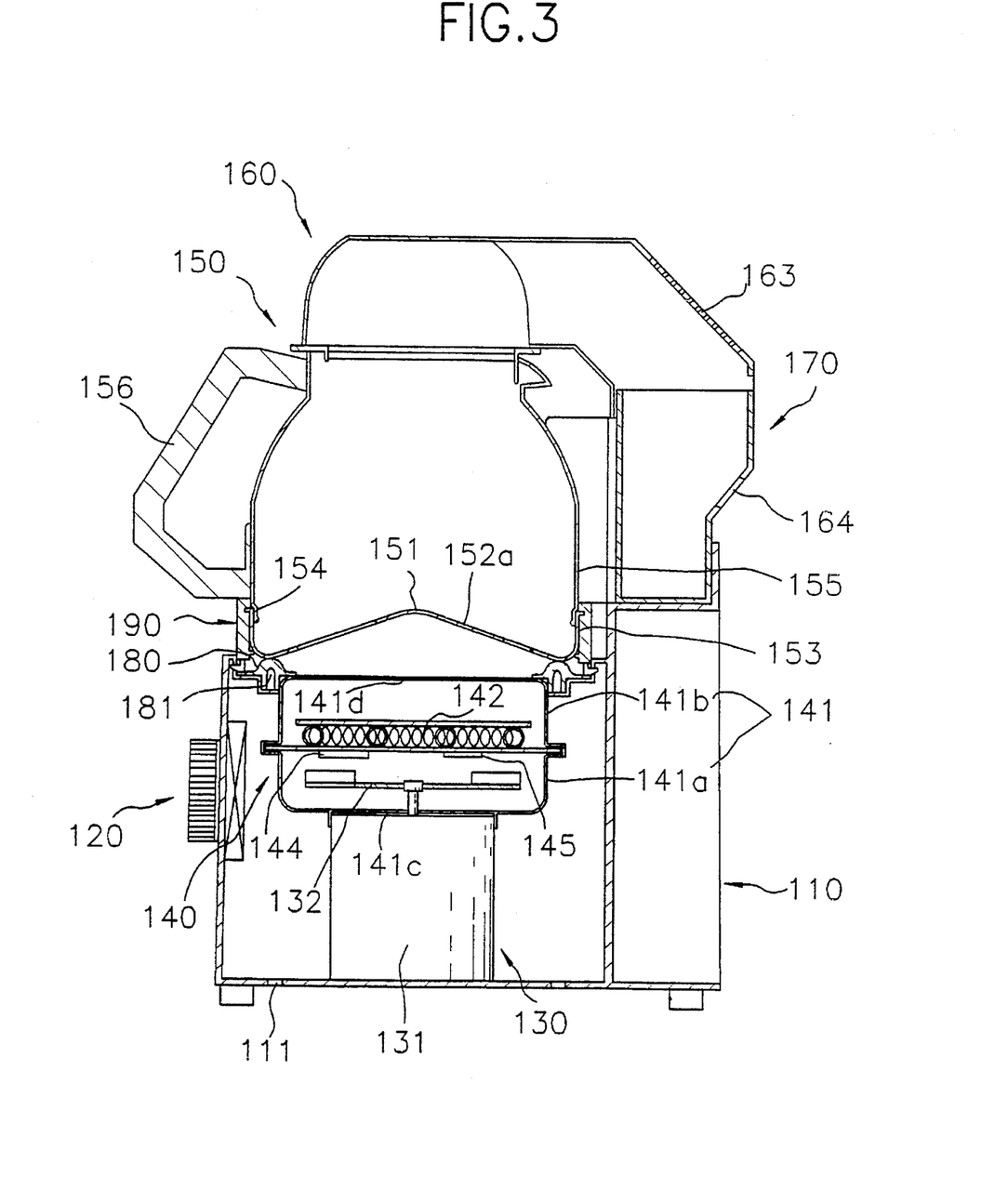
FIG. 3 is a vertical cross-sectional view of the apparatus illustrated in FIG. 1.
Figure 4:
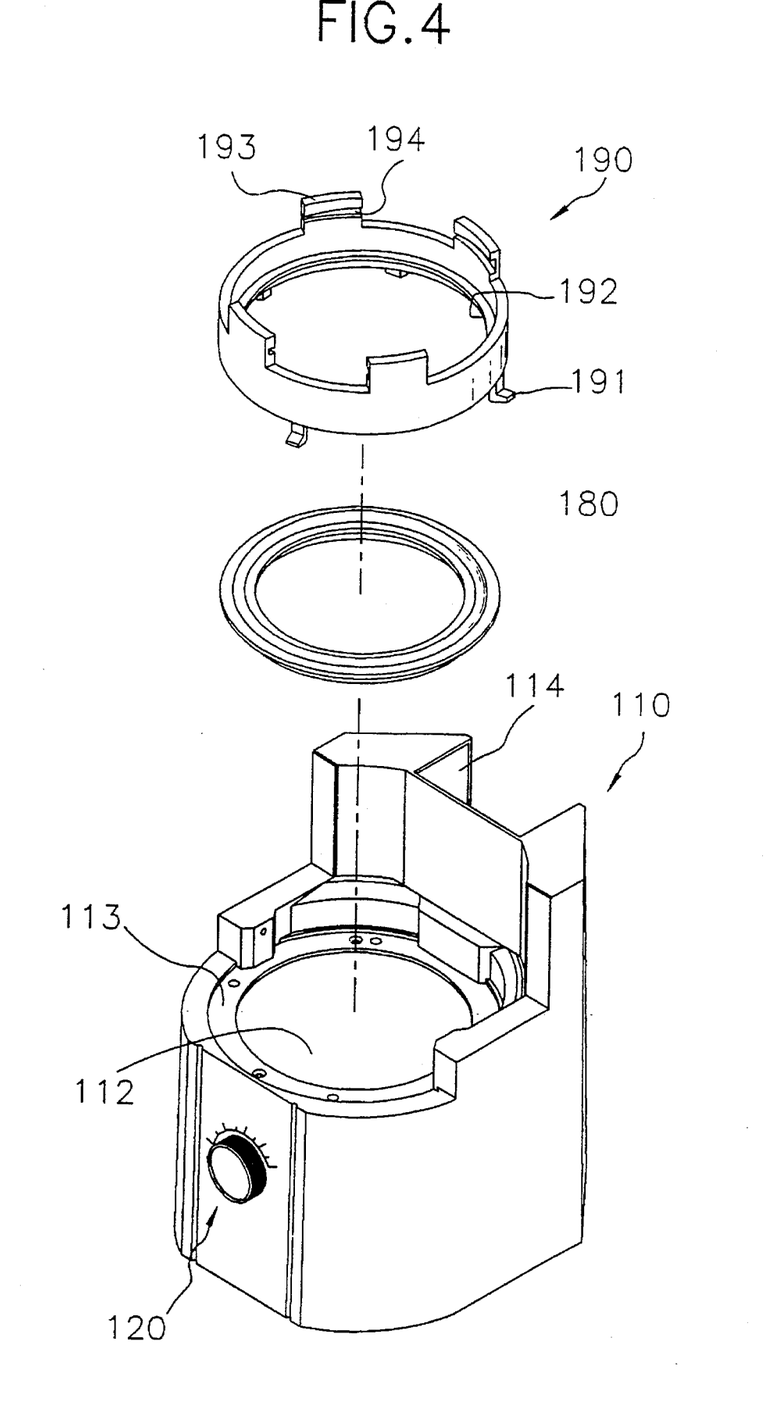
FIG. 4 is a perspective view showing the exploded state of a seal and roasting-vessel mounting member according to one embodiment of the present invention.

Particularly, the apparatus according to one embodiment of the present invention includes a main body or housing 110, a timer 120, a heater assemby 140 (FIG. 3), a roasting vessel 150 in which is placed raw coffee beans that are to be roasted, a cover 160, and a hull-receiving vessel 170 for receiving and storing therein separated hulls of the roasted beans (FIG. 3). The structure and characteristics of each element are explained below.

Main housing 110 has a central section which is similar to a cylindrical shape, and is open from above, and has an air inlet 111 (FIG. 3) formed therein, a blowing fan/heater mounting portion 112 (FIG. 4), a roasting vessel mounting portion 113, and a hull-receiving vessel mounting portion 114.

There are provided a plurality of air inlets 111, formed at the bottom of main housing 110, so that ambient air is inducted from the exterior of housing 110 to the interior. Blowing fan/heater mounting portion 112 of main housing 110 has a cylindrically-shaped, interior space, so that a blowing fan 132 (FIG. 3) and heater assembly 140 may be mounted thereon.

Roasting-vessel mounting portion or receptacle 113 has an annular flange or bead that projects inwardly to the inside of housing 110 at the upper circumference of blowing fan/heater mounting portion 112, so that roasting vessel 150, which will be explained hereinafter, can be safely mounted. Hull-receiving vessel mounting portion 114 enables hull-receiving vessel 170, which will be explained hereinafter, to be safely mounted at rear of housing 110, in which air recovering openings are formed.

Conventional timer 120 is installed in front of housing 110, and operated in a rotary manner, in order to allow for the performance of a roasting step and a cooling step. In other words, when timer 120 is in the roasting step, a blowing fan assembly 130 and heater assembly 140 are adapted to be operated, and when timer 120 is in the cooling phase, only blowing fan assembly 130 is adapted to be operated, while heater assembly 140 is not operated. It is preferred that timer 120 indicates the sign with regard to the roasting step and the cooling step at the front part of housing 110 at which timer 120 is installed, so that timer 120 can adjust the operating time of heater assembly 140 according to the quantity of raw coffee beans to be processed.

For example, the roasting state indicates the number of cups of coffee to be extracted from raw beans to be processed, and the cooling state is indicated in the unit of minutes, it being proper for the time to be set up to three minutes.

Figure 5:
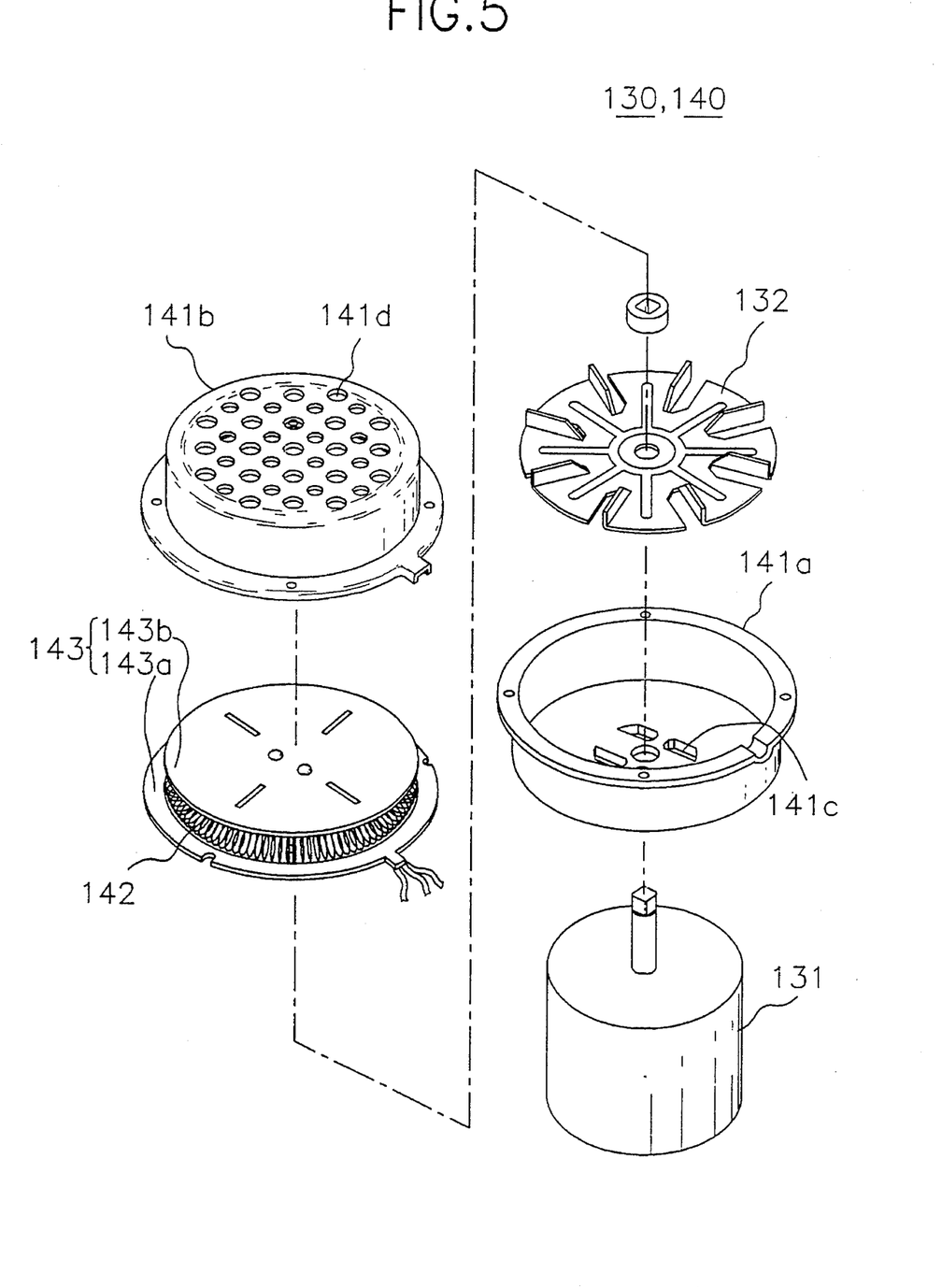
FIG. 5 is a perspective view showing the exploded state of a blowing fan and a heater unit according to one embodiment of the present invention.
Figure 6:
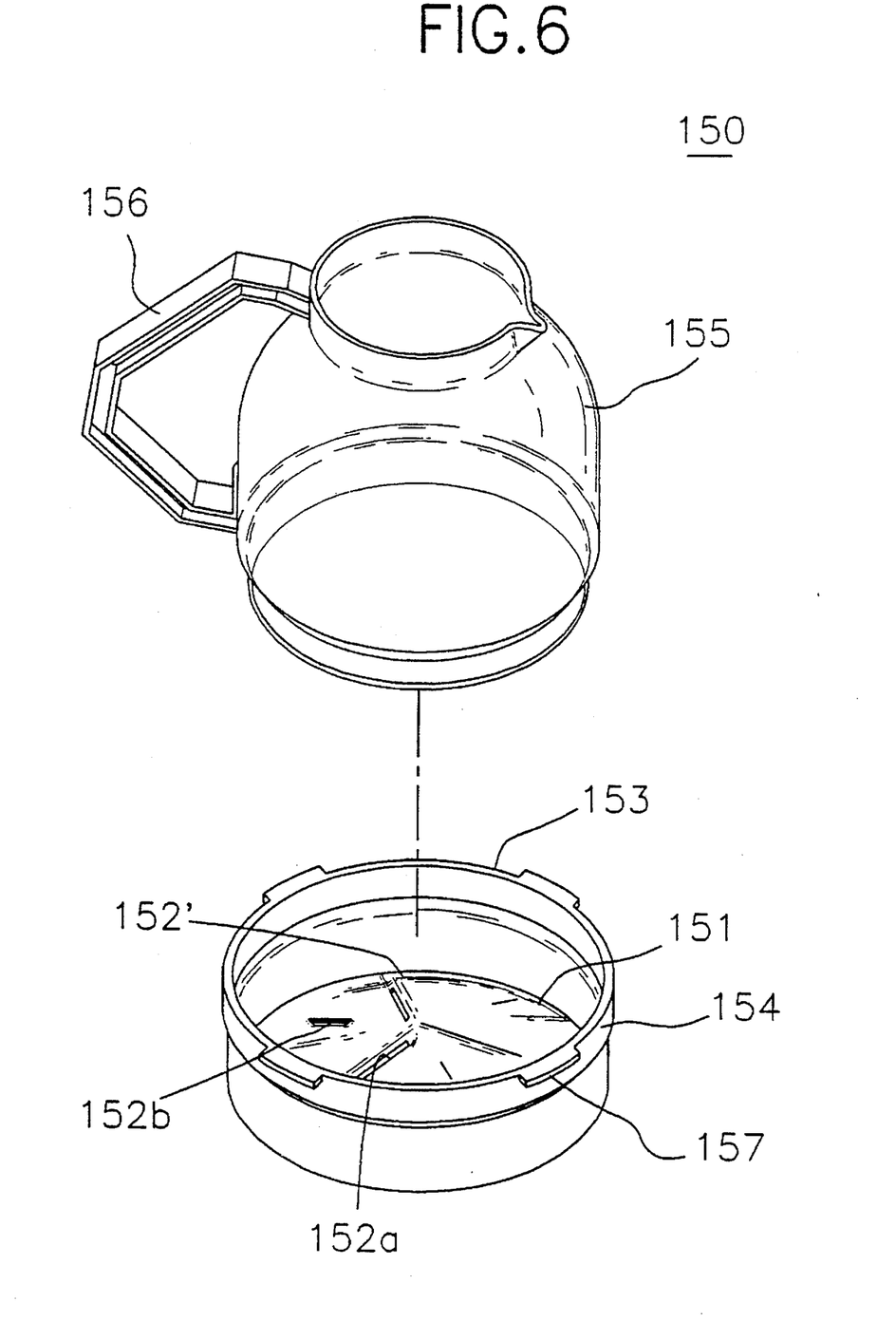
FIG. 6 is a perspective view showing a roasting vessel according to one embodiment of the present invention.
Figure 7:
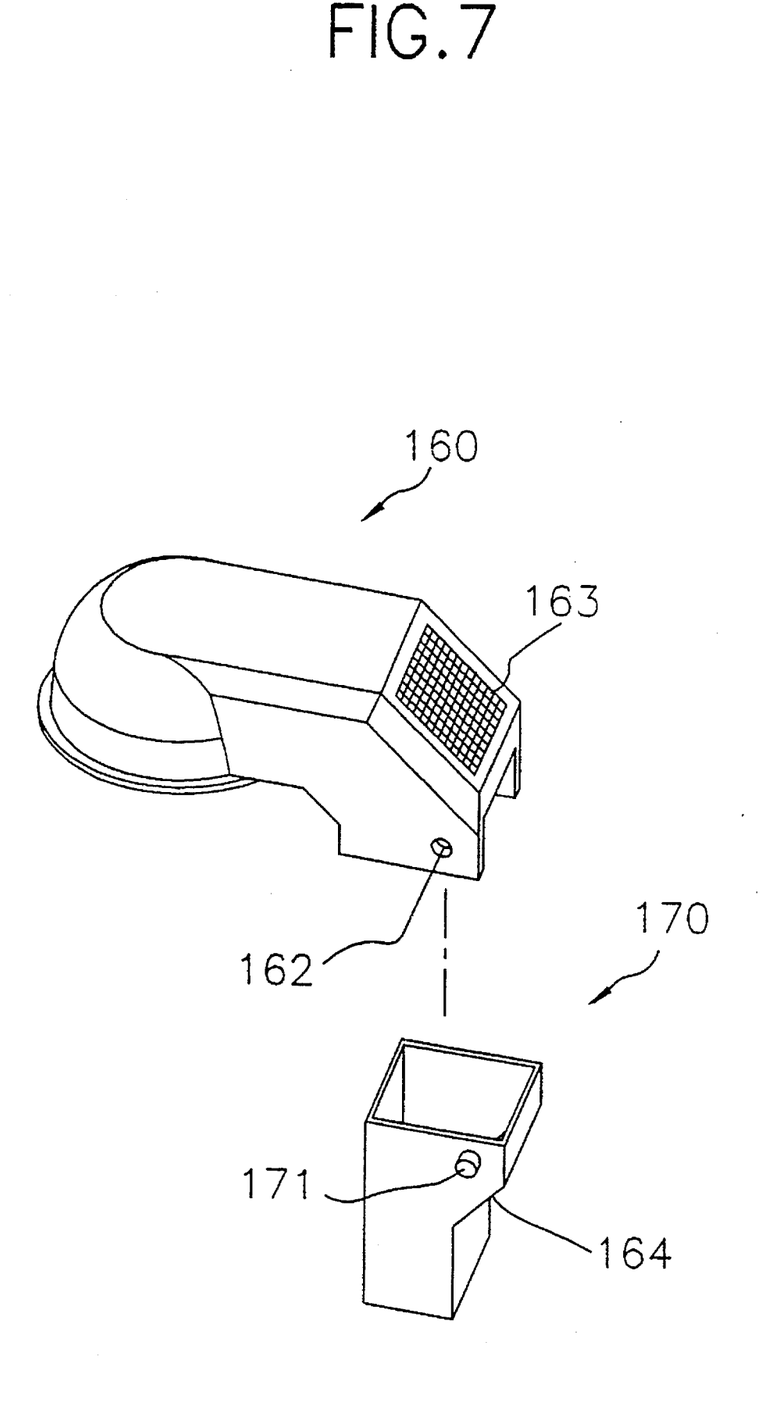
FIG. 7 is a perspective view showing the exploded state of the cover and hull-receiving vessel according to one embodiment of the present invention.

Fan assembly 130 comprises a motor 131 and a fan 132, and is installed at the bottom side of main housing 110, and is located in blowing fan/heater mounting portion 112. Preferably, a small-size motor, the capacity of which is around 10,000 rpm, is used. Fan 132 is structured such that it is made from a flat sheet that has vanes bent radially outwardly, as seen in FIG. 5, and is fabricated to the size which can be installed in heater assembly 140. Heater assembly 140 is operatively positioned above blowing fan 132 and consists of an outer casing 141 and a heating element 142 installed therein. Casing 141 has a lower casing section 141a and an upper casing section 141b having blow openings 141c and 141d, respectively.

Blow openings 141c in lower case 141a are formed largely in the part thereof which is opposite motor 131, in order to maximize the airstream. Blow openings 141d in upper casing 141b are formed in large number but in small size, and they extend over a large, wide area in order to disperse the airstream. Heating element 142 is fixed between a pair of insulating plates 143, an upper plate 143b and a lower plate 143a (FIG. 5). Lower insulating plate 143a is affixed to outer casing 141 between parts 141a and 141b thereof, with its diameter being larger than upper insulating plate 143b. The heating assembly includes a thermostat 144 and a temperature fuse 145 connected to heating element 142, in order to prevent overheating, in the conventional manner.

Roasting vessel 150 is placed in roasting-vessel mounting portion 113 formed in main housing 110, such that it is positioned above and over heater assembly 140, and it consists of a bottom portion 153 and a main body portion 155. Bottom portion 153 is made of a nonferrous metal having good thermal conductivity, such as aluminum, with the interior of bottom 151 projected upwardly like a cone, in which radially arranged blow openings 152a and 152b are formed.

Air openings 152a are formed in the central part of bottom 151 (FIG. 6), and air openings 152b are formed about the outer part. Three, or more, air openings 152a are arranged like steps. That is, each opening 152a is formed as a linear slot that marks the termination or outlet of a raised, upwardly sloping upper wall 152'. Each upper, sloping wall 152' begins substantially at a lower vertical level coplanar with the rest of the bottom surface 151, in which are formed air openings 152b, and then each rises in approximately 15 degree radial arc about bottom surface 151, and then terminates in the horizontal-slot air openings 152a. Three such air openings 152a thus provide swirling air current motion. Three air openings 152b are located at bottom surface 151, and are interspersed between three air openings 152b, whereby three air openings are spaced 120 degrees apart. However, it is possible to provide just one air opening 152b in order to supply the upward air current.

A circumferential portion 154 of bottom portion 153 is adapted to support the open bottom of main body portion 155. It is preferred that main body portion 155 be made of transparent glass having a low thermal conductivity, in order for the inside to be visible, so that a measuring indicator may be provided. For example, a user may measure the quantity accurately by indicating the number of cups of coffee to be extracted according to the quantity of raw beans fed into roasting vessel 150. In addition, main body portion 155 is equipped with a handle 156, and its cross-sectional area is preferably H-shaped to enlarge its thermal emitting effect.

Cover 160 (FIG. 7) for the roasting vessel is made from synthetic resin material for a good moldability. Cover 160 forms an air path so as to accomplish the functions of not only opening and closing the upper part of body portion 155 of the roasting vessel, but also directing and discharging separated raw-bean hulls to hull-receiving vessel 170 by being connected to it by means of hinge openings 162 located at both lateral sides of its rear. At the upper side of this cover 160, first air outlets 163 and second air outlets 164 are formed in the shape of long slots, and preferably, the first outlets are arranged radially on the central part of a cover, while the second outlets are arranged on the extended portion at which the airstream path is formed. Hull-receiving vessel 170 has projections 171 formed at its sides, so as to pivotally mount cover 160, and is fabricated so as to be safely placed in hull-receiving vessel mounting portion 114 located at the backside of housing 110. Hull-receiving vessel 170 forms a chute with inner and downwardly extending inclined surfaces, and has a plurality of air openings in its bottom surface similar to first and second air outlets 163 and 164, so that the airstream from cover 160 is finally discharged therethrough.

A seal 180 is further provided (FIGS. 4 and 8), in order to provide an air seal when roasting vessel 150 is placed on main housing 110. Also provided is a mounting member 190 that allows roasting vessel 150 to be attached to, or detached from, main housing 110. Annular seal or packing 180 is made of silicone having good heat-resistance, and is dimensioned such that the inner circumference thereof is placed on the outer annular edge of the upper surface of casing section 141b of heater assembly casing 141, while the outer circumference thereof is placed on the outer annular edge of the upper surface of casing section 141b of heater assembly casing 141, while the outer circumference thereof is placed on annular bead or flange of the roasting-vessel mounting portion 113 of housing 110. A groove is formed in the bottom surface of seal 180 in order to improve its compressibility. Roasting vessel mounting member 190 is also in annular form, and has a plurality of downwardly-extending projections 191 that are formed in its bottom surface, and which are affixed to the inner diameter part thereof. Mounting member 190 also has an inwardly-projecting, annular bead 192 formed at an intermediate inner circumference thereof, for abutment against the upper surface of seal 180. The outer diameter of annular bead 192 is approximately equal to the outer diameter of seal 180, whereby seal 180 snugly fits inside the lower portion of mounting member 190 against the bottom surface of bead 192. Thus, annular bead 192 provides a seal-bearing surface for compressing the seal. A plurality of upwardly-extending projections 193 are also provided, with an inclined groove 194 being formed at the upper side of roasting vessel mounting member 190, in order to attach and detach roasting vessel 150. Namely, roasting vessel 150 can be fixed by providing the same number of mating projections 157 on the outside of bottom surface 153 at the location corresponding to projections 193.

The assembly of the present invention of the aforementioned construction will now be explained.

Figure 8:
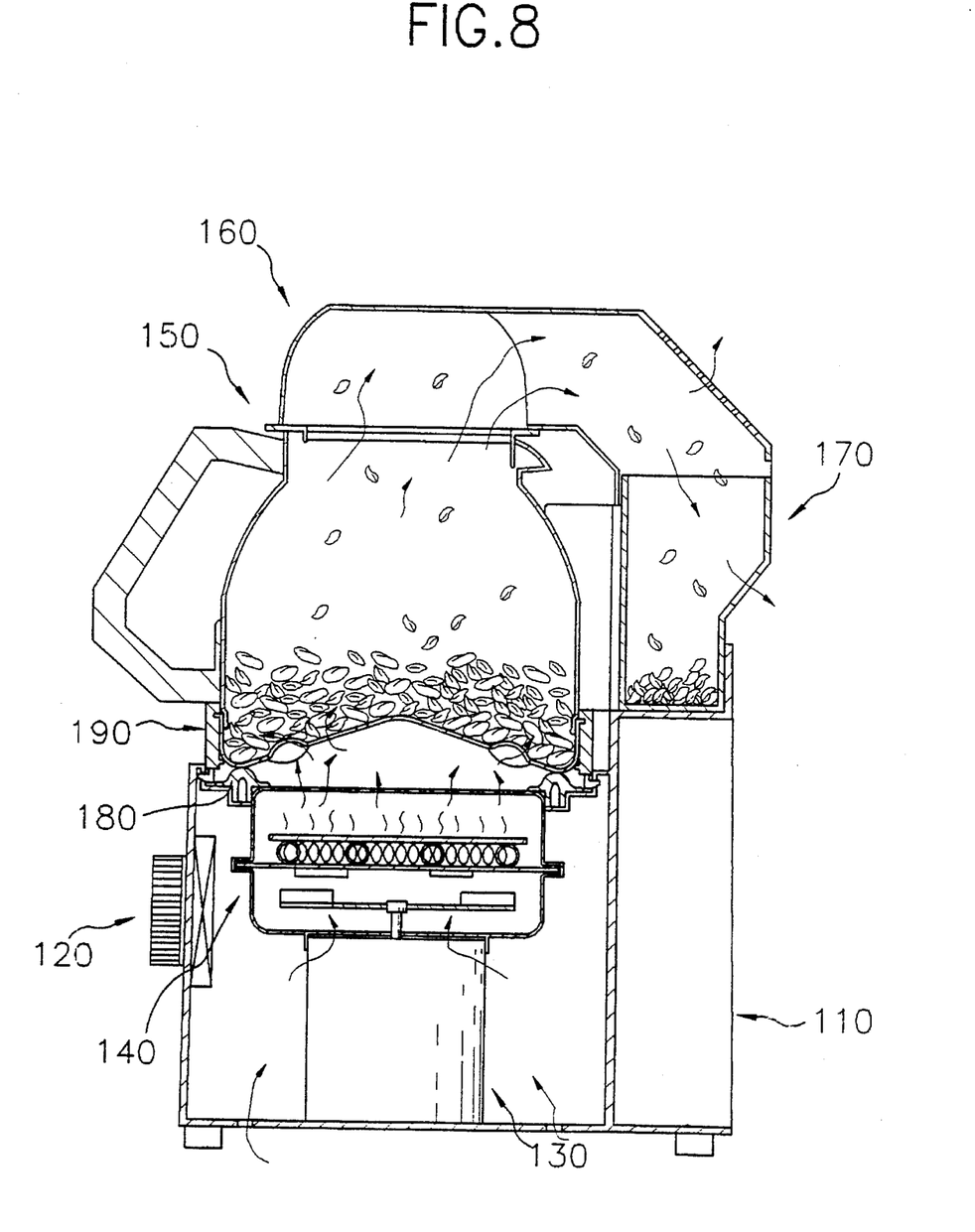
FIG. 8 is a vertical cross-sectional view showing the apparatus according to one embodiment of the present invention during operation.

Firstly, timer 120 is assembled in the front of housing body 110. Blowing fan 132 is integrally combined with motor 131, such that fan 132 is placed in lower casing 141a of heater assembly 140, when blowing fan assembly 130 and heater assembly 140 are assembled. Then, insulating plate assembly 143 having heating element 142 is installed in casing 141. In this case, lower insulating plate 143a is affixed at the location where lower casing 141a and upper casing 141b meet. Thus, blowing fan 132 is positioned at the lower side of heating assembly 142, and the blowing fan and heater are assembled integrally under the condition of being installed in casing 141. Body portion 155 of the roasting vessel is combined with bottom portion 153, with tight fitness. Cover 160 and hull-receiving vessel 170 are then combined, the former being adapted to be hinged to the latter by inserting projections 171 into holes 162. After each element has been assembled, blowing fan assembly 130 and heater assembly 140 are emplaced, so that they are positioned in blowing fan/heater housing portion 112 of main housing 110. At this time, motor 131 is affixed at the bottom of housing 110, while the upper part of heater casing 141 is close to roasting vessel mounting annular flange 113. Next, after putting seal 180 on roasting-vessel mounting flange 113 and on the upper surface-edge of casing part 141b, mounting member 190 is attached to roasting-vessel mounting flange 113, as seen in FIG. 3 by means of the projections, or feet, 191. Projections 191 abut against the underside of roasting vessel mounting flange 113, with annular bead 192 abutting against the upper surface of seal 180 for sandwiching the seal tight. Then, in order to mount roasting vessel 150, its main body portion 155 is rotated clockwise when its bottom portion 153 is positioned in mounting member 190, of which rotation is accomplished by holding handle 156 of main body portion 155. The rotation causes mating projections 157 to be inserted in inclined grooves 194 of mounting member 190. At this time, the annular bottom edge of bottom portion 153 of the roasting vessel is supported on the upper part of seal 180, as seen in FIG. 8. Thus, a grooved portion 181 of seal 180 is widened, which results in greater surface contact between bottom portion 153 and seal 180. In this way, an air-tightness is ensured. Furthermore, if body portion 155 is rotated counter-clockwise, removal is achieved. Cover 160 is then placed on the entrance of main body portion 155 of the roasting vessel, and hull-receiving vessel 170 is placed in hull-receiving mounting portion 114 of main housing 110. The apparatus of the present invention is, then, in a usable state.

The use of the present invention assembled as above is in the order set forth below.

a) A suitable quantity of raw beans are put into roasting vessel 150. At this time, the required quantity can be determined on the basis of the scale on main body portion 155.

b) Roasting vessel 150 containing raw beans is placed on mounting member 190, and thereafter, locked by being rotated clockwise.

c) After cover 160 is hinged to hull-receiving vessel 170, hull-receiving vessel 170 is placed in hull-receiving mounting portion 114 of main housing 110, and roasting vessel 150 is covered with cover 160.

d) The timer is set to the desired indicia on the scale thereof, according to the quantity of raw beans to be roasted. At this time, if controlled in accordance with the scale indicated on main body portion 155, a roasting step and a cooling step are accomplished, in order. For the roasting step, fan assembly 130 and heater assembly 140 are operated, so that motor 131 and fan 132 are rotated at the speed of about 10,000 rpm or over, and heating element 142 is heated to about 240° C. Thus, ambient air is sucked through air inlets 111 of the bottom of housing 110 and openings 141c of heater casing 141, and a heated airstream is generated to ascend rapidly through heater casing 141d. Since the ascending heated airstream is sealed via seal 180, it is discharged through openings 152a and 152b formed at the bottom of a bottom portion 153 of the roasting vessel, without leaking to the outside. Thus, the airstream passing through air openings ascends vertically, and the ascending airstream passing through air openings whirls around in the circumferential direction.

Consequently, a compound, ascending stream is generated at the inside of roasting vessel 150. By such heated and partially turbulent hot airstream, raw beans in roasting vessel 150 are mixed uniformly, roasted and gradually hulled. The hulls removed from the raw beans by the turbulent airstream ascend upwardly. At this time, the heated wind ascending in roasting vessel 150 is diminished in its quantity, because a part of it is discharged through first outlets 163 and second outlets 164 in cover 160, and the hulls ascending to cover 160 are directed to hull-receiving vessel 170 along the upstream blowing path.

The hulls then descend along with a stream of air discharged to hull-receiving vessel 170, in order to accumulate in hull-receiving vessel 170. The raw beans being roasted with their hulls removed have a deep brown color. When raw beans have been roasted adequately, timer 120 causes the apparatus to enter into the cooling stage after finishing the roasting step. In the cooling stage, since the power source is continuously connected only to blowing fan 132 and disconnected from heater unit 140, only blowing fan 132 operates. Since a cooling air is introduced, the raw beans are cooled, and oil does not leak out, at the surfaces of raw scrubbing. The cooling step continues for about three minutes. Interruption of the power source to blowing fan 130 ends the cooling stage.

e) After raw beans have been roasted, cover 160 is lifted up and the handle of roasting vessel 150 is rotated counter-clockwise to separate roasting vessel 150 from housing 110, to thereby obtain the roasted beans.

f) Afterwards, the hulls are separated from cover 160 by pressing both sides of hull-receiving vessel 170, and thrown out. Raw beans obtained through a roasting process as above are pulverized by means of a pulverizer and extracted using an extracting machine, and usable as raw bean coffee.

Figure 10:
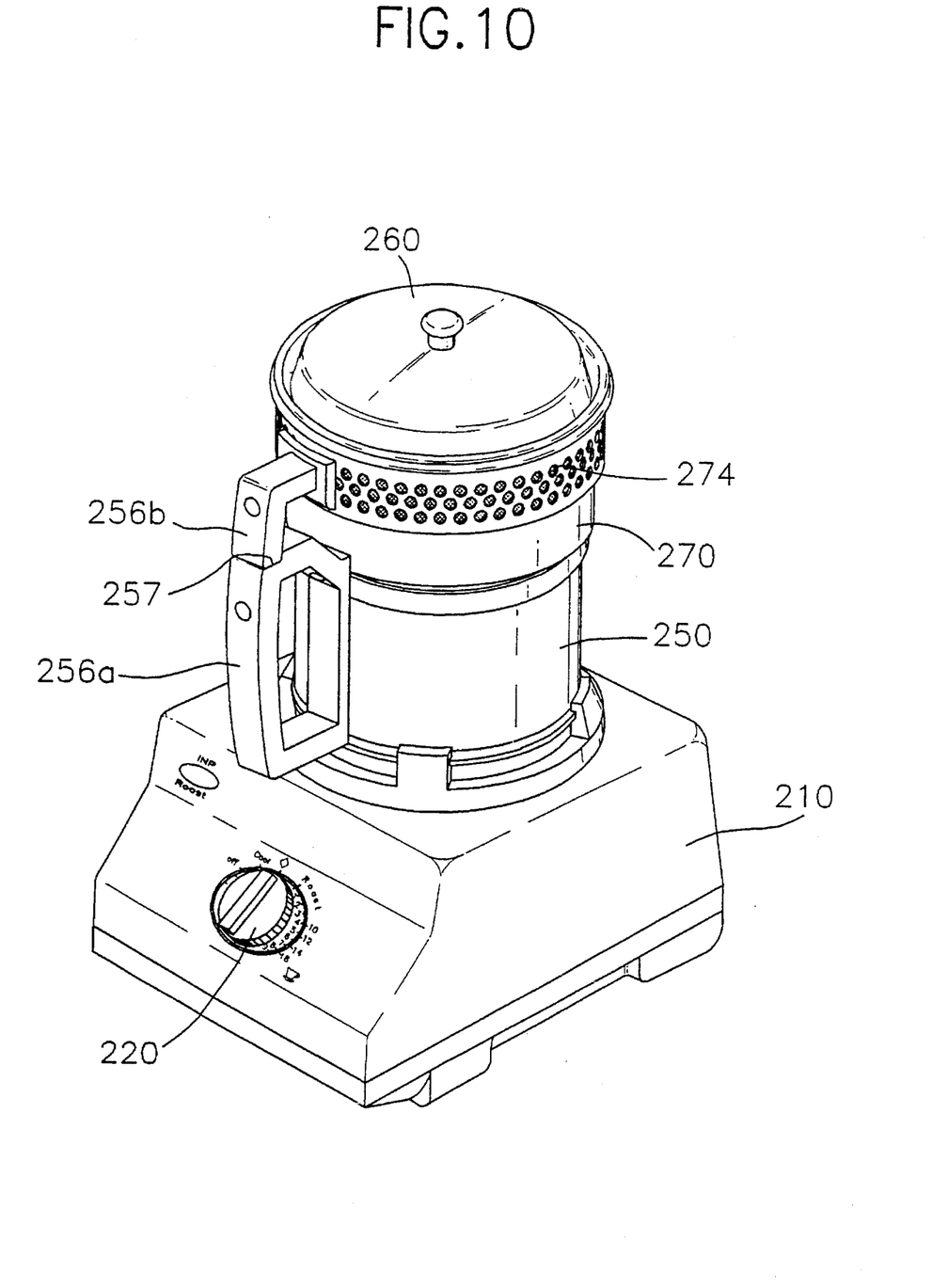
FIG. 10 is a perspective view showing the assembled state of the apparatus according to another embodiment of the present invention.
Figure 11:
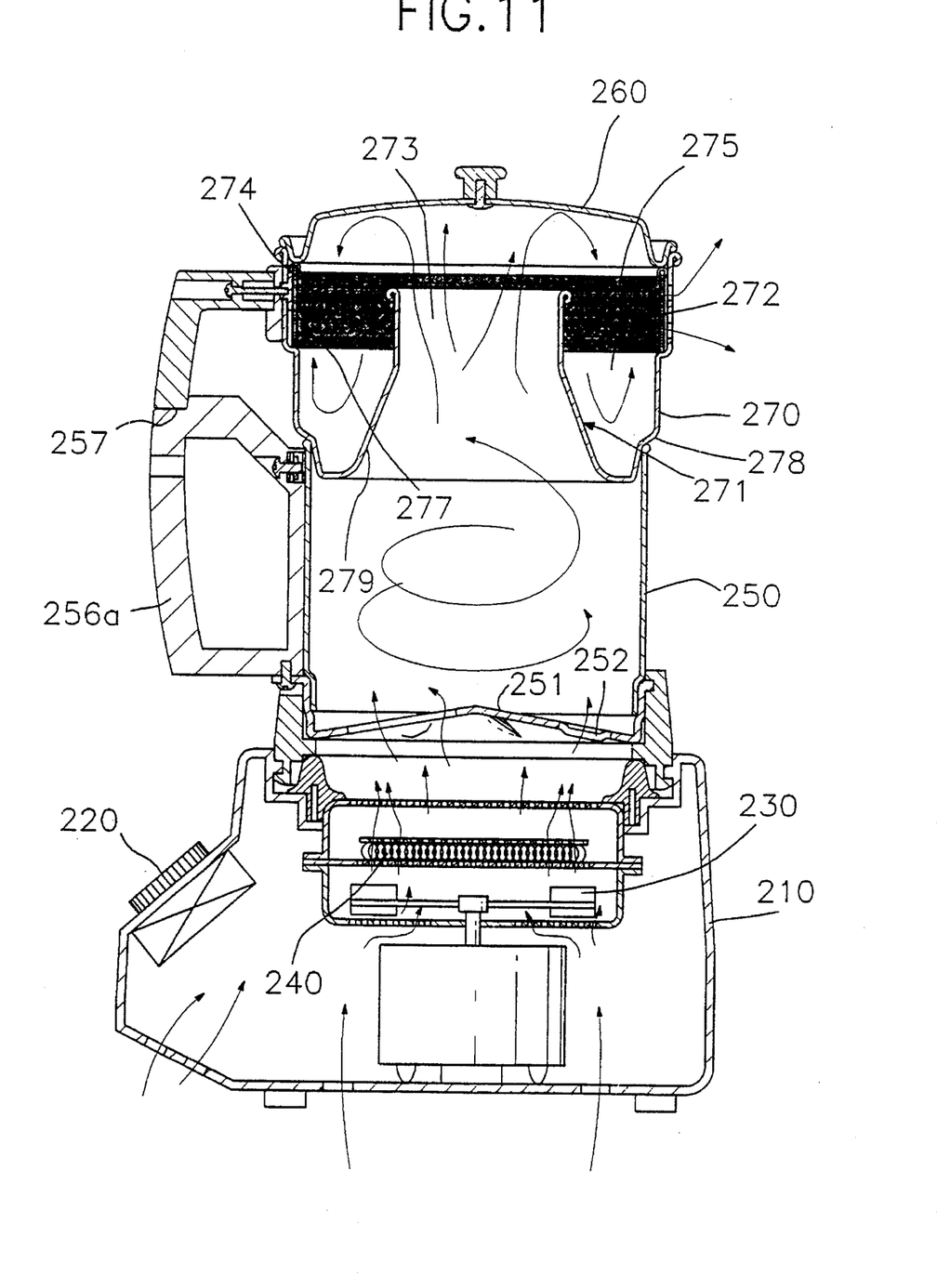
FIG. 11 is a cross-sectional view showing the assembled state of the apparatus illustrated in FIG. 10.

Another preferred embodiment of the present invention will be described in detail with referring to FIGS. 9–11.

The apparatus for roasting raw coffee beans according to another embodiment of the present invention comprises a main housing having an air inlet; a blower fan assembly mounted on the main housing for blowing air; a heater assembly mounted on the housing and above the blower fan assembly for generating heat, the blower fan assembly directing the heat upwardly; a whirlwind generating plate above the heater assembly; a roasting vessel above the heater assembly for containing raw coffee beans to be roasted; a hull-receiving vessel for receiving and storing the hulls of the raw coffee beans blown along the air stream directed thereto from the roasting vessel, the hull-receiving vessel having an air outlet; a filter provided in the air outlet; a cover for covering the roasting vessel, the cover guiding hulls from the raw coffee beans along the path of the air stream; and a power means for providing power to the blower fan assembly and the heater assembly.

Particularly, the apparatus according to another embodiment of the present invention includes a heater 240, a blowing fan assembly 230, a whirlwind generating plate 251 above heater 240, a roasting vessel 250 made of transparent glass, vertically combined on whirlwind generating plate 251, a roasting vessel handle 256a provided at one side of roasting vessel 250 by means of a sealing band 253, a groove portion 257 formed at the upper edge of roasting vessel handle 256a, a hull-receiving vessel 270 which is detachably inserted onto roasting vessel 250, a discharge hole 273 and a hull-receiving part 272 separated by an exhaustion inducing inclined plane 271 formed at the inner portion of hull-receiving vessel 270, a plurality of exhausting holes 274 perforated at the upper portion of hull-receiving vessel 270, a filter 275 provided in exhausting holes 274, a hull-receiving vessel handle 276 which is combined, with one side of hull-receiving vessel 270 and of which lower portion is placed on groove portion 257 and a cover 260 which closes hull-receiving vessel 270.

Roasting vessel 250 is made of transparent glass material for visibility into and has a cylindrical shape of which upper and lower portion are opened. Whirlwind generating plate 251 is provided under roasting vessel 250.

Hull-receiving vessel 270 is separated into discharge hole 273 and hull-receiving part 272 by exhaustion inducing inclined plane 271, and is provided with a projection 277 at the middle of hull-receiving vessel 270, on which the lower portion of filter 275 is suspended. Also provided is a suspending projection 278 at the lower portion of hull-receiving vessel 270, which is suspended on roasting vessel 250. An inclined portion 279 is formed at the lower portion of discharge hole 273 to accomplish smooth exhaustion of air including hulls from wide portion to narrow portion.

Filter 275 formed in exhausting hole 274 plays the role of a filter for exhausting only air outwardly.

The bottom of whirlwind generating plate 251 is formed as a continuous inclined plane 254. Blow openings 252 are formed in terraces at steps between inclined plane 254.

Blow openings 252 are formed alternately as long and short openings to generate a whirlwind.

Cover 260 is formed as a dome-shape and induces the exhausted air through discharge hole 273 downwardly to drop hulls into hull-receiving part 272.

When roasting raw coffee beans using the apparatus of the present invention, an appropriate amount of raw coffee beans is put in roasting vessel 250 and the vessel is combined with a main body 210. Then, hull-receiving vessel 270 including cover 260 is provided onto roasting vessel 250.

When hull-receiving vessel 270 is inserted into roasting vessel 250, hull-receiving vessel handle 256b comes into contact with roasting vessel handle 256a to give a simple look.

Figure 9:
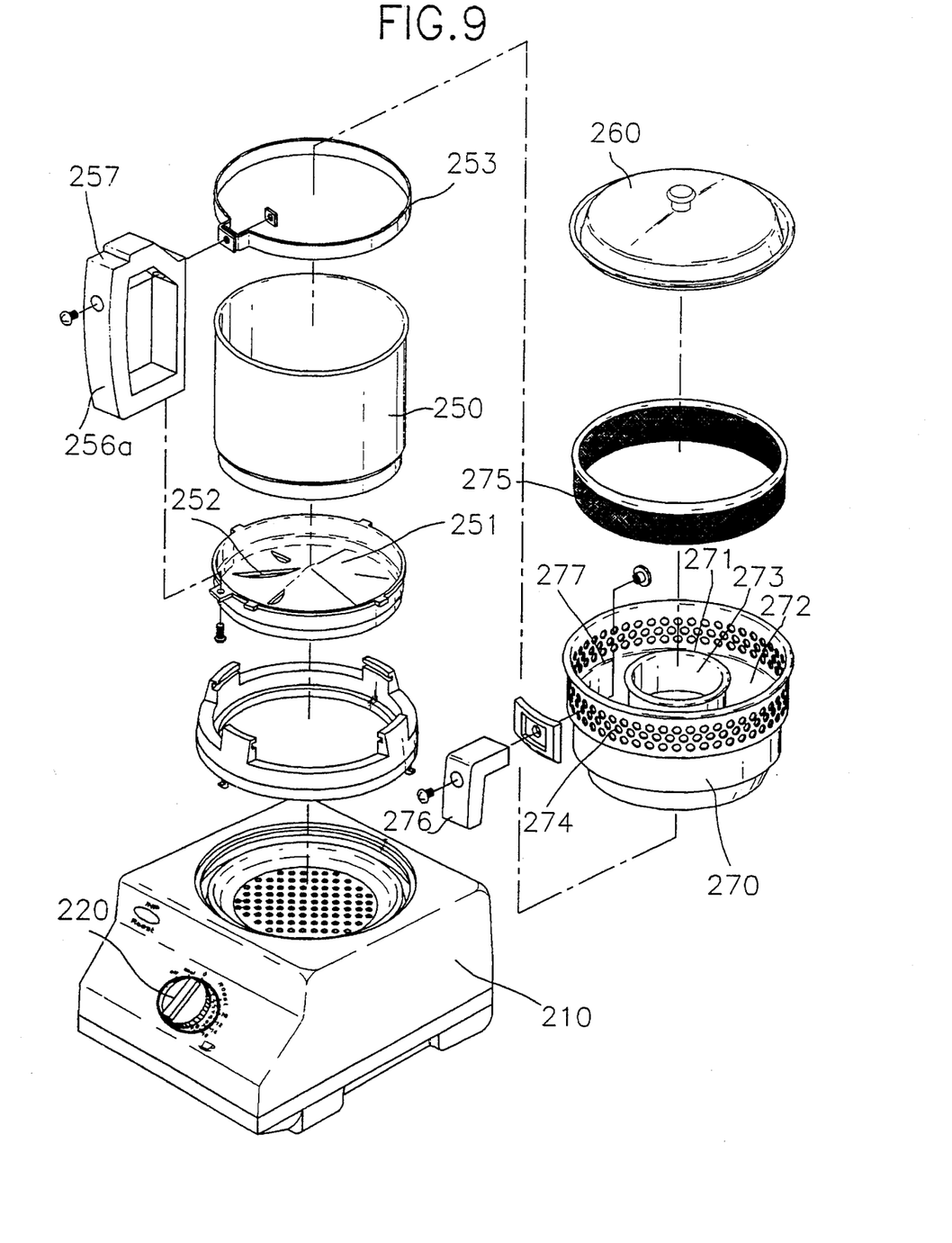
FIG. 9 is a perspective view showing the exploded state of an apparatus according to another embodiment of the present invention.

The raw coffee beans could also be placed through discharge hole 273 after opening cover 260, even when roasting vessel 250 and hull-receiving vessel 270 are combined as shown in FIG. 9.

At this stage, timer 220 is set to a desired division to proceed with the roasting step and the cooling step.

At the roasting step, blowing fan 230 rotates at about 1,000 rpm and heater 240 is heated to about 240° C. The airstream flowing into the apparatus by means of blowing fan 230 is heated by heater 240 and rises spirally and rapidly through blow openings 252 in terraces of whirlwind generating plate 251.

The air flow through blow openings 252 in terraces forms a rising stream while whirling.

At this time, the raw coffee beans in roasting vessel 250 drop and roll over and over to be mixed uniformly and to be cooked by the hot air stream. The raw coffee beans change their rotating direction which chips off the hulls during rolling and the removed hulls rise by the air through discharge hole 273 in the middle of hull-receiving vessel 270.

The raised air through discharge hole 273 is spread above hull-receiving vessel 270 to all directions to reduce its velocity and is exhausted through filter 275 and exhausting hole 274.

As the air stream is spread and exhausted, the hulls of the raw coffee beans drop into hull-receiving part 272 separated from discharge hole 273 by exhaustion inducing inclined plane 271.

Meanwhile, since roasting vessel 250 is transparent, the raw coffee beans could be observed with naked eyes. If dark brown color is represented, the raw coffee beans are regarded as being roasted appropriately.

After appropriate roasting for about 3–5 minutes, the cooling step in which blowing fan assembly 230 is operated is started by means of a timer 220.

After cooling for about 3 minutes, the power is turned off. Hull-receiving vessel 270 is detached while catching a hull-receiving vessel handle 256b and roasting vessel 250 is detached while catching roasting vessel handle 256a to thereby obtain the roasted beans and complete the roasting of the raw beans.

The roasted beans are pulverized using a pulverizer and extracted using an extracting machine for drinking.

Since the apparatus according to the above-mentioned embodiment includes housing 210, roasting vessel 250 and hull-receiving vessel 270 successively, housing 210 could be designed at will. Moreover, housing 210 and hull-receiving vessel 270 can not possibly be damaged by the heat from heater 240.

In addition, since the air stream rises through discharge hole 273 and is spread to all directions, while reducing its velocity, the hulls of the raw coffee beans drop advantageously into hull-receiving part 272 without generating powdered hulls.

The preferred embodiments of the present invention aforementioned can be fabricated to a small size so as to be used easily at home, and it can provide raw bean coffee by roasting a small quantity of raw beans whenever required. Additionally, it enables users to enjoy a variable taste and fragrance of raw beans by adjusting the processing time according to a personal taste.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. An apparatus for roasting raw coffee beans comprising:
   a main housing having an air inlet;
   a blower fan assembly mounted on said main housing for blowing air;
   a heater assembly mounted in said housing and above said blower fan assembly for generating heat, said blower fan assembly directing the heat upwardly;
   a roasting vessel above said heater assembly for containing raw coffee beans to be roasted;
   a hull-receiving vessel for receiving and storing hulls of said raw coffee beans blown along the air stream directed thereto from said roasting vessel, said hull-receiving vessel having an air outlet;
   a cover for covering said roasting vessel, said cover guiding hulls from said raw coffee beans along the path of the air stream; and
   a power means for providing power to said blower fan assembly and said heating assembly,
   wherein said roasting vessel includes a plurality of holes for allowing the heated air stream from said heater assembly to enter into the interior of said roasting vessel, and said cover has a hull-guide means for directing the hulls from the roasted coffee beans along a specific downstream path.

2. The apparatus for roasting raw coffee beans as claimed in claim 1, further comprising an annular seal upon which said roasting vessel is at least partially supported, said seal being supported by a portion of said heater assembly and a part of said main housing.

3. The apparatus for roasting raw coffee beans as claimed in claim 2, wherein said seal comprises an annular groove for aiding in its sealing function.

4. The apparatus for roasting raw coffee beans as claimed in claim 1, further comprising an annular, detachable mounting member for mounting said roasting vessel.

5. The apparatus for roasting raw coffee beans as claimed in claim 4, wherein said mounting member comprises a bottom, and plurality of mounting projections formed at said bottom, said projections being operatively associated with a part of said main housing for mounting said mounting member and said roasting vessel; said mounting member further comprising an interior annular bead for contact against said seal, and at least one upwardly extending finger-member for detachably supporting roasting vessel.

6. The apparatus for roasting raw coffee beans as claimed in claim 1, further comprising a timer for controlling the operation of said power means; said timer having a first stage for coupling said power means to both said fan assembly and said heater assembly, and a second stage for coupling said power means to said fan assembly and for disconnecting said power means from said heater assembly, whereby a cooling cycle is provided for cooling the roasted coffee beans.

7. The apparatus for roasting raw coffee beans as claimed in claim 1, wherein said roasting vessel comprises a main body portion, and a bottom portion, said bottom portion having an interiorly, upwardly-projecting, substantially conically-shaped bottom surface; said plurality of holes in said roasting vessel being formed in said bottom surface; said plurality of holes comprising a first set and a second set for creating a whirling vertical motion to the heated airstream ascending therethrough, whereby said raw coffee beans are roasted and also caused to have their hulls separated to ascend upwardly with the airstream to said hull receiving vessel.

8. The apparatus for roasting raw coffee beans as claimed in claim 7, wherein said roasting vessel comprises a handle having an H-shaped cross section for increasing thermal emission.

9. The apparatus for roasting raw coffee beans as claimed in claim 7, wherein said bottom portion of said roasting vessel comprises at least one projection for cooperating with at least one upwardly extending finger member for detachably mounting said roasting vessel.

10. The apparatus for roasting raw coffee beans as claimed in claim 1, wherein said cover opens and closes the upper entrance of said roasting vessel, said cover being pivotally connected to said hull-receiving vessel.

11. An apparatus for roasting raw coffee beans comprising:
   a main housing having an air inlet;
   a blower fan assembly mounted on said main housing for blowing air;
   a heater assembly mounted in said housing and above said blower fan assembly for generating heat, said blower fan assembly directing the heat upwardly;
   a roasting vessel above said heater assembly for containing raw coffee beans to be roasted;
   a hull-receiving vessel for receiving and storing hulls of said raw coffee beans blown along the air stream directed thereto from said roasting vessel, said hull-receiving vessel having an air outlet;
   a cover for covering said roasting vessel, said cover guiding hulls from said raw coffee beans along the path of the air stream;
   a power means for providing power to said blower fan assembly and said heater assembly;
   a whirlwind generating plate above said heater assembly; and
   a filter provided in said air outlet.

12. The apparatus for roasting raw coffee beans as claimed in claim 11, wherein the bottom of said whirlwind generating plate is formed as a continuous inclined plane and is provided with blow openings at steps between said inclined plane.

13. The apparatus for roasting raw coffee beans as claimed in claim 12, wherein a first group of said blow openings having a first length and a second group of said blow openings having a second length longer than the first length are alternately arranged.

14. The apparatus for roasting raw coffee beans as claimed in claim 11, wherein said roasting vessel is made of transparent glass and is fixed on said whirlwind generating plate.

15. The apparatus for roasting raw coffee beans as claimed in claim 14, wherein a roasting vessel handle ms provided on one side of said roasting vessel using a sealing band.

16. The apparatus for roasting raw coffee beans as claimed in claim 11, wherein a hull-receiving vessel handle is provided on one side of said hull-receiving vessel.

17. The apparatus for roasting raw coffee beans as claimed in claim 16, wherein said hull-receiving vessel handle comes in contact with said roasting vessel handle when combining said hull-receiving vessel with said roasting vessel.

18. The apparatus for roasting raw coffee beans as claimed in claim 11, wherein said discharge hole having said inclined plane is formed at the center of said hull-receiving vessel, whereby air stream including hulls is smoothly blown from wide to narrow portion.

19. The apparatus for roasting raw coffee beans as claimed in claim 11, further comprising a projection for fixing said filter in said hull-receiving vessel.

20. The apparatus for roasting raw coffee beans as claimed in claim 11, further comprising a suspending projection which is suspended at the upper portion of said roasting vessel at the lower portion of said hull-receiving vessel.

21. The apparatus for roasting raw coffee beans as claimed in claim 11, wherein said cover is formed in a dome-shape, whereby the air stream blown through said discharge hole is directed downwardly to drop the hull in said hull-receiving part.

* * * * *